E. E. GAMON.
NUT.
APPLICATION FILED JUNE 28, 1909.

963,042.

Patented July 5, 1910.

WITNESSES:

INVENTOR
Ernest E. Gamon
BY
Fischer & Sanders
ATTORNEYS.

UNITED STATES PATENT OFFICE.

ERNEST E. GAMON, OF NEWARK, NEW JERSEY.

NUT.

963,042.

Specification of Letters Patent. Patented July 5, 1910.

Application filed June 28, 1909. Serial No. 504,642.

*To all whom it may concern:*

Be it known that I, ERNEST E. GAMON, a citizen of the United States, residing in the city of Newark, county of Essex, and State of New Jersey, have invented certain new and useful Improvements in Nuts, of which the following is a full, clear, and exact description, such as will enable others skilled in the art to which the invention pertains to make, construct, and use the same.

The object of my invention is to provide a nut having a main body portion, angular end members and a screw-threaded aperture for use on flanged pipe connections and similar flanged mechanism, in connection with bolts for holding such parts in rigid union, and the use of my device results in a very considerable saving of time in the uniting of such parts together, and also in making such connections in a more convenient and effective manner than has heretofore been the case.

A further object of my invention is to provide the main body portion near the end members with a weakened or thinned portion, in order that said device may have a certain amount of resiliency when undue pressure is brought to bear upon the internal mechanism of the device, to which the nut is applied, as in the case of freezing in a water meter.

Figure 1:
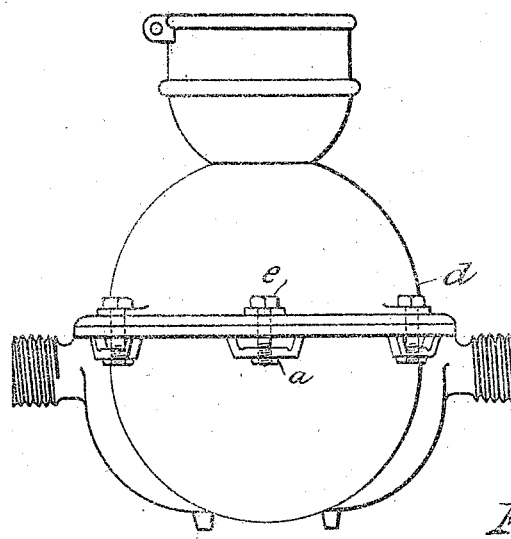
Figure 2:
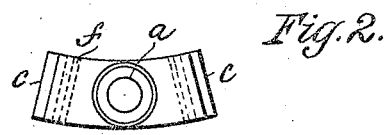
Figure 3:
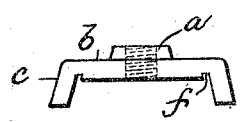

In the accompanying drawings forming a part of the specification, Figure 1 represents my improvement as applied to the flange of a water meter. Fig. 2 is a plan view; and Fig. 3 is a side view of the detached nut.

Similar letters of reference refer to like parts throughout the specification and drawings.

In carrying out my invention, I make use of the threaded nut $a$, the main body portion $b$ being integrally connected together to the end members $c$, and which is preferably cast of any suitable material. The longitudinal sides of the main body portion $b$ of the nut are preferably made to conform to the body $d$ of the tube, pipe or other part to which the device is applied, when the threaded bolts $e$ are inserted through the holes in the flanges and screwed home.

By the use of my device, owing to its shape and configuration, no inconvenience is experienced in the turning of the nuts while screwing the bolts into them as is often the case where nuts of different types are used.

$f$ represents a groove or saw slot formed in the under side of the main body portion of the nut near the end members $c$ and in close proximity to the same, designed to weaken the main body portion at that point, in order to give to the nut a certain amount of resiliency or spring when undue pressure is brought to bear upon the interior of the device to which the nut is applied, as for instance, when a greater pressure than that anticipated is exerted in the casing, thereby causing the end members $c$ to spread and the body portion of the nut to assume a curved position, thus drawing said main body portion of the nut nearer to the flange to which it is secured, thereby permitting the flanges to slightly separate.

I claim:

1. A device of the class described, comprising an elongated body portion of uniform width centrally reinforced and provided with a screw-threaded aperture, depending end members integrally formed with said body portion provided with flat bearing faces, said body portion on its under side being provided with slots located in close proximity to the inner faces of said depending end members.

2. A device of the class described, comprising a longitudinally curved body portion of uniform width centrally reinforced and provided with a screw-threaded aperture, integral end members extending downwardly and outwardly from and of the same width as said body portion and provided with flat bearing faces, said body portion on its under side being provided with slots extending across the body portion, the outer edges of the slots coinciding with the inner faces of the end members.

This specification signed and witnessed this 25th day of June, 1909.

ERNEST E. GAMON.

Witnesses:
C. A. ALLISTON,
L. M. SANDERS.